United States Patent
Yamamoto

(10) Patent No.: US 8,212,529 B2
(45) Date of Patent: Jul. 3, 2012

(54) CHARGE/DISCHARGE PROTECTION CIRCUIT, BATTERY PACK INCLUDING CHARGE/DISCHARGE PROTECTION CIRCUIT, AND ELECTRONIC DEVICE THEREOF

(75) Inventor: Norifumi Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 384 days.

(21) Appl. No.: 12/664,796

(22) PCT Filed: Sep. 1, 2008

(86) PCT No.: PCT/JP2008/066137
§ 371 (c)(1),
(2), (4) Date: Dec. 15, 2009

(87) PCT Pub. No.: WO2009/034934
PCT Pub. Date: Mar. 19, 2009

(65) Prior Publication Data
US 2010/0188044 A1 Jul. 29, 2010

(30) Foreign Application Priority Data
Sep. 14, 2007 (JP) ................................ 2007-238685

(51) Int. Cl.
*H01M 10/46* (2006.01)

(52) U.S. Cl. ........................................ 320/134; 320/136
(58) Field of Classification Search .................. 320/107, 320/114, 116, 118, 134, 136
See application file for complete search history.

(56) References Cited

U.S. PATENT DOCUMENTS

| 2002/0158608 | A1* | 10/2002 | Miyoshi | 320/162 |
| 2004/0189259 | A1* | 9/2004 | Miura et al. | 320/134 |
| 2007/0108940 | A1 | 5/2007 | Sainomoto et al. | |
| 2008/0048620 | A1* | 2/2008 | Zhang | 320/134 |
| 2009/0121683 | A1* | 5/2009 | Goto | 320/134 |

FOREIGN PATENT DOCUMENTS

| JP | 2002-34166 | 1/2002 |
| JP | 2002-176730 | 6/2002 |
| JP | 2007-143284 | 6/2007 |
| WO | WO 2007/097181 A1 | 8/2007 |

* cited by examiner

*Primary Examiner* — Edward Tso
(74) *Attorney, Agent, or Firm* — Cooper & Dunham LLP

(57) ABSTRACT

A charge/discharge protection circuit for protecting a plurality of serially connected secondary batteries from overcharge, overdischarge, and current overflow by detecting overcharge, overdischarge, and current overflow and switching on/off a discharge controlling FET or a charge controlling FET according to the detection results is disclosed including an overcharge protecting circuit configured to prioritize the detection results corresponding to overcharge and switch off the charge controlling FET in a case where a charger is connected to the charge/discharge protection circuit.

10 Claims, 3 Drawing Sheets

CHARGE/DISCHARGE PROTECTION CIRCUIT, BATTERY PACK INCLUDING CHARGE/DISCHARGE PROTECTION CIRCUIT, AND ELECTRONIC DEVICE THEREOF

TECHNICAL FIELD

The present invention relates to a charge/discharge protection circuit, a battery pack including the charge/discharge protection circuit, and an electronic device including the battery pack.

BACKGROUND ART

There are many kinds of charge/discharge protection circuits used for a lithium ion secondary battery. FIG. 3 is a block diagram depicting a semiconductor apparatus and a protection circuit provided inside a battery pack using the semiconductor apparatus.

As shown in FIG. 3, a semiconductor apparatus (charge/discharge protection circuit) 1005, being a main part of a battery pack 1010, includes an overcharge protecting circuit 1011 (dedicated to a battery cell 1001), another overcharge protecting circuit 1013 (dedicated to a battery cell 1002), an overdischarge detecting circuit 1012 (dedicated to the battery cell 1001), another overdischarge detecting circuit 1014 (dedicated to the battery cell 1002), a discharge overcurrent detecting circuit 1015, a charge overcurrent detecting circuit 1016, an oscillating circuit 1017, a counter circuit 1018, a logic circuit 1019, another logic circuit 1023, a level shift circuit 1020, a short circuit detecting circuit 1021, a delaying circuit 1022, a delay time reducing circuit 1024, and a standby circuit 1026. Furthermore, in FIG. 3, reference numeral 1003 indicates a charger, reference numeral 1000 indicates a charge controlling FET, and reference numeral 1200 indicates a discharge controlling FET.

The standby circuit 1026 is connected to a V-terminal. In order to save power, the standby circuit 1026 is configured to disconnect the power supply by switching off the switches provided in the paths that supply power to each internal circuit in a case where a standby state is detected.

Next, a basic operation conducted by the semiconductor apparatus (charge/discharge protection circuit) is described in a case where overcharge, overdischarge, discharge overcurrent, charge overcurrent, or short-circuiting is detected.

When overcharge, overdischarge, discharge overcurrent, charge overcurrent, or short-circuiting is detected by the overcharge detecting circuits 1011, 1013, the overdischarge detecting circuits 1012, 1014, the discharge overcurrent detecting circuit 1015, the charge overcurrent detecting circuit 1016, or the short-circuit detecting circuit 1021, respectively, the oscillating circuit 1017 begins to oscillate and the counter circuit 1018 begins counting.

When the counter circuit 1018 counts a predetermined delay time upon the detection of overcharge or charge overcurrent, the Cout (Charge output) becomes a low (L) level via the logic circuit (e.g., latch) 1019 and the level shift circuit 1020, to thereby switch off the charge controlling FET 1000. When the counter circuit 1018 counts a predetermined delay time upon the detection of overdischarge, discharge overcurrent, or short-circuiting, the Dout (Discharge output) becomes a low (L) level via the logic circuit 1023, to thereby switch off the discharge controlling FET 1200.

The charger 1003 is connected to the battery pack 1010. Accordingly, when a charging current is supplied to the battery pack 1010, the source voltage of the charge controlling FET 1100 becomes lower than the source voltage of the discharge controlling FET 1200. The source voltage of the discharge controlling FET 1200 corresponds to the voltage of a Vss terminal of the semiconductor apparatus 1005. Although a resistor is connected to a V-terminal of the semiconductor apparatus 1005, the source voltage of the charge controlling FET 1100 is substantially equal to the voltage of the V-terminal since the V-terminal has high impedance.

Therefore, when a charging current is supplied to the battery pack 1010, the voltage of the V-terminal becomes lower than the voltage of the Vss terminal. When the voltage of the V-terminal becomes a predetermined amount (charge overcurrent detection voltage) lower than the voltage of the Vss terminal, a charge overcurrent is detected and the Cout becomes a low level. Thereby, the charge controlling FET 1100 is switched off. A relationship of the charge overcurrent "I", the charge overcurrent detection voltage "Vchgdet", and the ON resistances "Ron1", "Ron2" of the discharge controlling FET 1200 and the charge controlling FET 1100 is expressed as follows.

$$I = Vchgdet/(Ron1+Ron2)$$

Next, functions and circuitry of the delay time reducing circuit 1024 are described. Since the delay time is typically 1 second or more when overcharge is detected by the overcharge detecting circuits 1011, 1013, the delay time leads to the problem of increasing the time for testing, for example, the semiconductor apparatus or a protection circuit (not shown).

In order to shorten the testing time, a predetermined signal (e.g., −3V), which is usually not applied to the −V terminal, is applied to the delay time reducing circuit 1024 during a testing mode for testing, for example, the semiconductor apparatus or the protection circuit. Alternatively, a testing signal may be provided in the delay time reducing circuit 1024 so that a testing signal can be directly applied to the delay time reducing circuit 1024. By applying the predetermined signal to the delay time reducing circuit 24, the oscillating circuit 1017 outputs higher frequency, to thereby shorten the delay time. As a result, testing time can be shortened. Although this configuration of the delay time reducing circuit is effective when overcharge, overdischarge, discharge overcurrent, or charge overcurrent is detected, it is particularly effective for a case of detecting overcharge where delay time is long.

The oscillating circuit 1017 may be configured as a ring oscillator using a constant current inverter and a capacitor. Since the oscillation frequency of the ring oscillator is determined by the constant current of the constant current source, the capacity of the capacitor, and the threshold of the constant current inverter, delay time can be shortened by, for example, increasing the constant current of the constant current source, substantially reducing the capacity of the capacitor, or changing the threshold of the constant current inverter.

Alternatively, in order to shorten the delay time, there is also a method of changing the position of extracting output from the counter circuit 1018. The circuitry and operations of a related art example of a charge/discharge protection circuit are described in, for example, Japanese Laid-Open Patent Application No. 2002-176730.

The conditions for recovering from overdischarge are different depending on whether the charge/discharge protection circuit is a latch type or an overdischarge recovery type. In a case of the latch type, when the voltage of plural serially connected secondary batteries becomes equal to or greater than an overdischarge detection voltage, an overdischarge detection signal changes from a low (L) level to a high (H)

level on condition that a charger is connected to the charge/discharge protection circuit. In a case of the overdischarge recovery type, an overdischarge detection signal changes from a low (L) level to a high (H) level regardless of whether a charger is connected to the charge/discharge protection circuit when the voltage of plural serially connected secondary batteries becomes equal to or greater than an overdischarge recovery voltage.

In a case where a charger is connected to a charge/discharge protection circuit having plural serially connected secondary batteries where overdischarge of one of the secondary batteries is detected, it is necessary to switch off a charge controlling FET of the charge/discharge protection circuit when overcharge of another one of the plural secondary batteries is detected.

However, in order to switch off the charge controlling FET, it is necessary to recognize the detection of overcharge of the other one of the plural secondary batteries even where overdischarge of the one of the plural secondary batteries is detected. In order to achieve such recognition, it is necessary to keep the charge/discharge protection circuit including its detecting circuits operating to some degree.

However, in order to keep the charge/discharge protection circuit operating, it becomes necessary to maintain a standby current flowing in the charge/discharge protection circuit even after the overdischarge is detected. This necessity results in undesired constant consumption of power. In addition, the flow of the standby current after the detection of overdischarge leads to degradation of the secondary batteries.

DISCLOSURE OF INVENTION

It is a general object of the present invention to provide a charge/discharge protection circuit, a battery pack, and an electronic device that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention can be realized and attained by a charge/discharge protection circuit, a battery pack, and an electronic device particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a charge/discharge protection circuit for protecting a plurality of serially connected secondary batteries from overcharge, overdischarge, and current overflow by detecting overcharge, overdischarge, and current overflow and switching on/off a discharge controlling FET or a charge controlling FET according to the detection results, including an overcharge protecting circuit configured to prioritize the detection results corresponding to overcharge and switch off the charge controlling FET in a case where a charger is connected to the charge/discharge protection circuit.

Furthermore, another embodiment of the present invention provides a charge/discharge protection circuit for protecting a plurality of serially connected secondary batteries from overcharge, overdischarge, and current overflow by detecting overcharge, overdischarge, and current overflow and switching on/off a discharge controlling FET or a charge controlling FET according to the detection results, including an overcharge protecting circuit configured to prioritize the detection results corresponding to overcharge and switch on the discharge controlling FET and switch off the charge controlling FET in a case where overdischarge of one of the secondary batteries is detected while overcharge of another secondary battery is detected even when the one of the secondary batteries has a voltage no greater than an overdischarge detection voltage.

Furthermore, another embodiment of the present invention provides a charge/discharge protection circuit for protecting a plurality of serially connected secondary batteries from overcharge, overdischarge, and current overflow by detecting overcharge, overdischarge, and current overflow and switching on/off a discharge controlling FET or a charge controlling FET according to the detection results, including an overcharge protecting circuit configured to prioritize the detection results corresponding to overcharge and prevent overflow of current in one of the plural secondary batteries by switching off the charge controlling FET in a case where overcharge of the one of the plural secondary batteries is detected.

Furthermore, another embodiment of the present invention provides a battery pack including the charge/discharge protection circuit according to an embodiment of the present invention.

Furthermore, another embodiment of the present invention provides an electronic device, a mobile phone, a portable game device, a digital camera, a portable audio device including the battery pack according to an embodiment of the present invention.

BEST MODE FOR CARRYING OUT THE INVENTION

Figure 1:
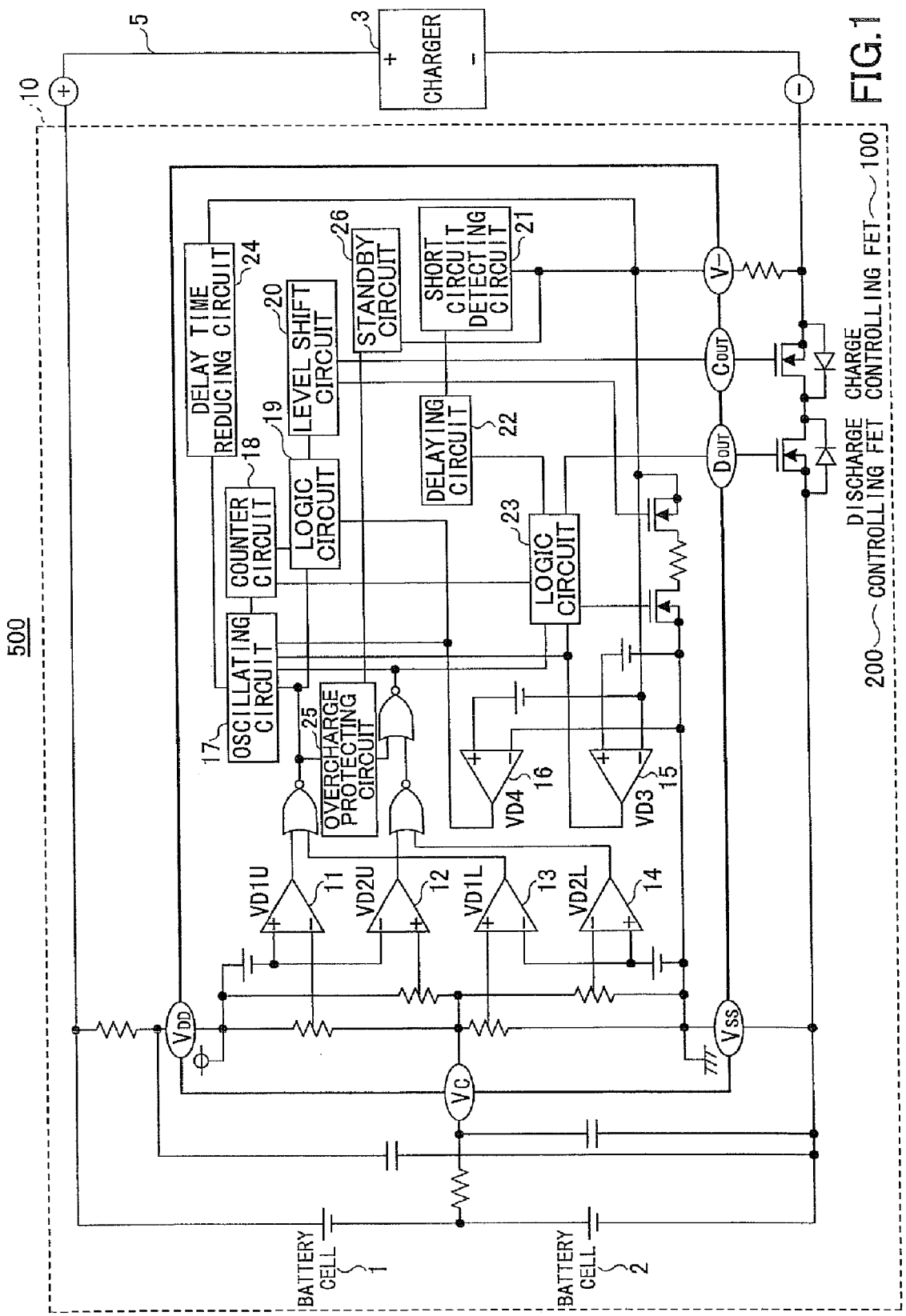
FIG. 1 is a schematic diagram for describing a charge/discharge protection circuit according to an embodiment of the present invention.

The present invention is described in detail based on the embodiments illustrated in the drawings.

FIG. 1 is a schematic diagram for describing a charge/discharge protection circuit 5 according to an embodiment of the present invention. The charge/discharge protection circuit 5 according to an embodiment of the present invention is provided in a battery pack 10. The battery pack 10 according to an embodiment of the present invention is installed in an electronic device 500. The electronic device 500 is, for example, a mobile phone, a portable game device, a digital camera, or a portable audio device.

Figure 3:
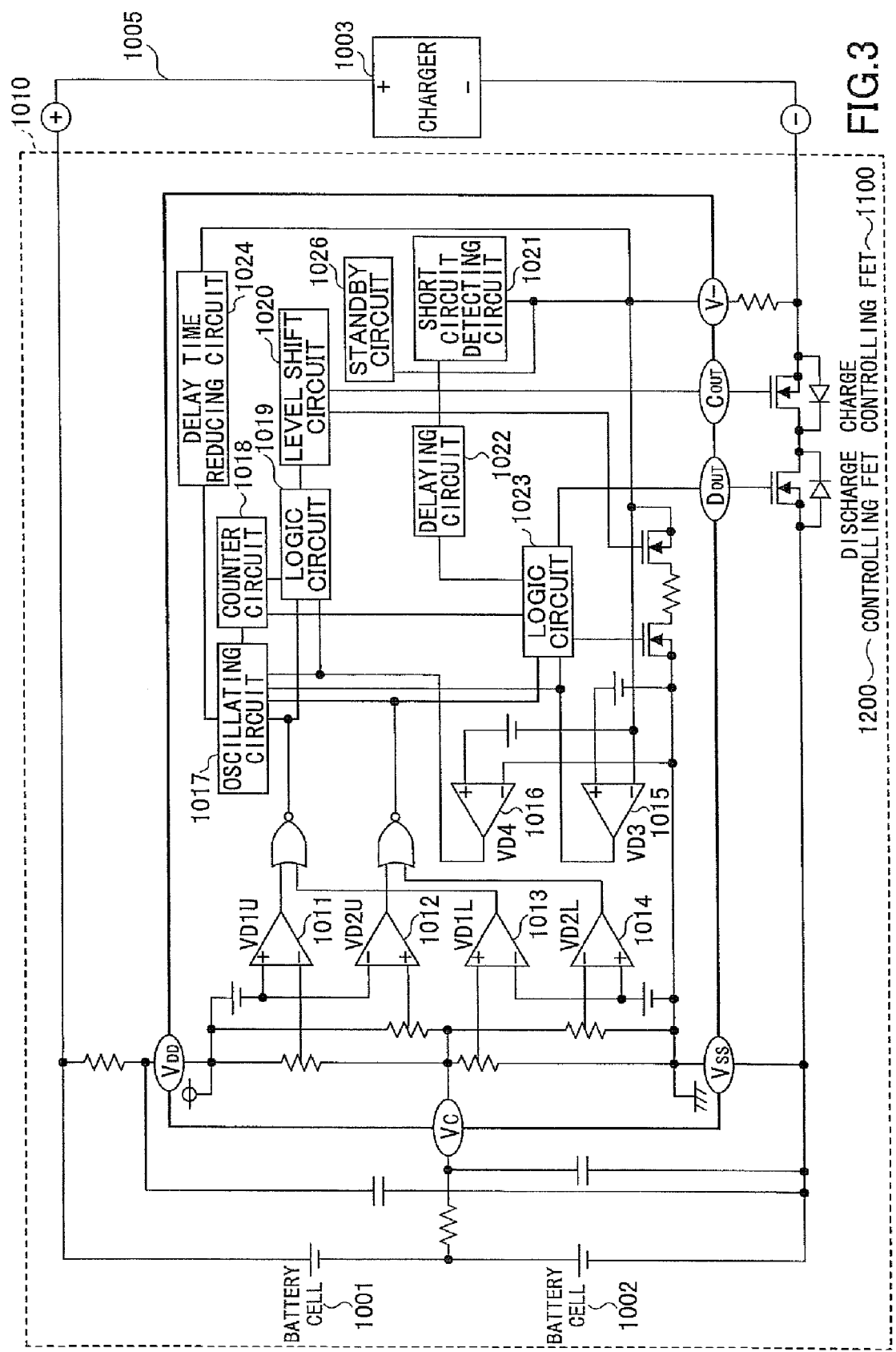
FIG. 3 is a schematic diagram for describing a charge/discharge protection circuit according to a related art example.

As shown in FIG. 1, the charge/discharge protection circuit (semiconductor apparatus) 5, which is a main part of the battery pack 10, includes an overcharge protecting circuit 11 (dedicated to a battery cell 1), another overcharge protecting circuit 13 (dedicated to a battery cell 2), an overdischarge detecting circuit 12 (dedicated to the battery cell 1), another overdischarge detecting circuit 14 (dedicated to the battery cell 2), a discharge overcurrent detecting circuit 15, a charge overcurrent detecting circuit 16, an oscillating circuit 17, a counter circuit 18, a logic circuit 19, another logic circuit 23, a level shift circuit 20, a short circuit detecting circuit 21, a delaying circuit 22, a delay time reducing circuit 24, an overcharge protecting circuit 25, and a standby circuit 26. Furthermore, in FIG. 1, reference numeral 3 indicates a charger, reference numeral 100 indicates a charge controlling FET, and reference numeral 200 indicates a discharge controlling FET. Some of the differences with the charge/discharge protection circuit 1005 shown in FIG. 3 are that the charge protection circuit 25 is added to the charge/discharge protection circuit 5 and that a standby signal from the standby circuit 26 is input to the charge protection circuit 25.

In a case where plural serially connected secondary batteries (in this embodiment, battery cells 1 and 2) lose balance, that is, a case where overcharge of one secondary battery is detected while overdischarge of another secondary battery is detected, the discharge controlling FET 200 is switched on and the charge controlling FET 100 is switched off, so that current can be prevented from excessively flowing. Furthermore, since the charge/discharge protection circuit 5 cannot be used if both the charge controlling FET 100 and the discharge controlling FET 200 are switched off, the discharge controlling FET 100 according to this embodiment of the present invention is to be always switched on.

Figure 2:
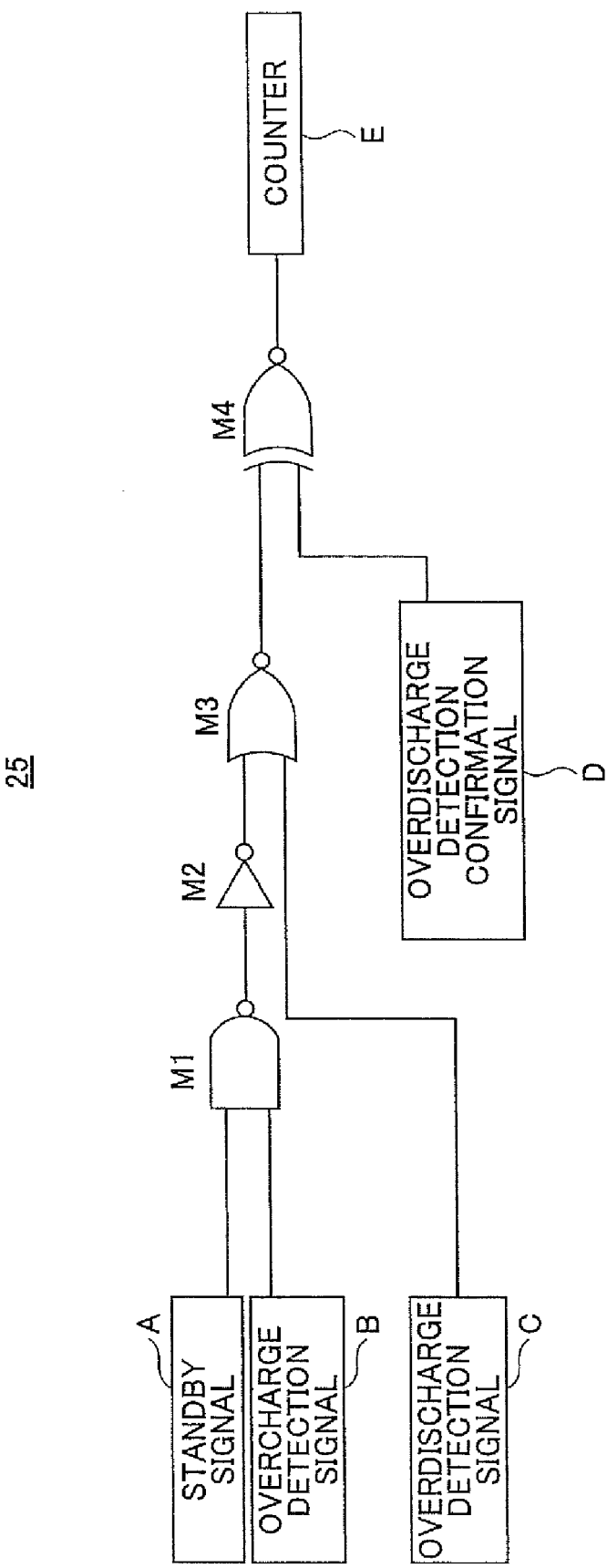
FIG. 2 is a schematic diagram for describing a overcharge protecting circuit according to an embodiment of the present invention.

FIG. 2 is a schematic diagram for describing an embodiment of an overcharge protecting circuit that prioritizes detection of overcharge.

A standby signal A, which is an internal signal input from the standby circuit 26 to the overcharge protecting circuit 25 in FIG. 1, becomes a low (L) level when overdischarge of one of the secondary batteries 1, 2 is detected and becomes a high (H) level when the charge/discharge protection circuit 5 is in a regular mode and when connected to the charger 3.

An overcharge detection signal B, which is an internal signal of the overcharge detection circuits 11, 13, becomes a low level when no overcharge is detected and becomes a high level when overcharge is detected.

An overdischarge detection signal C, which is an internal signal of the overdischarge detection circuits 12, 14, becomes a high level when no overdischarge is detected and becomes a low level when overdischarge is detected.

An overdischarge detection confirmation signal D, which is an internal signal of the overdischarge detection circuits 12, 14, becomes a high level after delay time of overdischarge elapses after the detection of overdischarge and becomes a low level when no overdischarge is detected.

(A)<No Overcharge, Overdischarge or Overcurrent Detected>

In a case where no overcharge, overdischarge or overcurrent is detected, both the charge controlling FET 100 and the discharge controlling FET 200 are switched on. Because no overdischarge is detected, the standby signal A becomes a high level.

The overcharge detection signal B becomes a low level because no overcharge is detected, and a high level signal is output from a NAND circuit M1. Because the high level signal is input to an inverter circuit M2 from the NAND circuit M1, the inverter circuit M2 outputs a low level signal.

The overdischarge detection signal C becomes a high level because no overdischarge is detected. The low level signal output from the inverter circuit M2 and the high level overdischarge detection signal C are input to a NOR circuit M3. In this case, a low level signal is output from the NOR circuit M3.

The overdischarge detection confirmation signal D becomes a low level in the case where no overdischarge is detected. The low level signal output from the NOR circuit M3 and the low level overdischarge detection confirmation signal D are input to an XNOR circuit M4. In this case, a high level signal is output from the XNOR circuit M4. Since the high level signal is output from the XNOR circuit M4, a counter E remains inactive.

(B)<Overdischarge of One Battery Cell Detected while Other Battery Cell has Voltage no Less than Overdischarge Detection Voltage but no Greater than Overcharge Detection Voltage>

In a case where overdischarge of one battery cell 1 of plural serially connected secondary batteries (in this embodiment, two secondary batteries) is detected while another battery cell 2 has a voltage no less than an overdischarge detection voltage but no greater than an overcharge detection voltage (overdischarge recovery voltage), the standby signal A becomes a low level.

The overcharge detection signal B becomes a low level because no overcharge is detected. Accordingly, the low level standby signal A and the low level overcharge detection signal B are input to the NAND circuit M1, causing the NAND circuit M1 to output a high level signal. Because the high level signal is input to the inverter circuit M2, the inverter circuit M2 outputs a low level signal.

Although the overdischarge detection signal C becomes a high level in a case where all of the secondary batteries have a voltage no greater than an overcharge detection voltage but no less than an overdischarge detection voltage, the overdischarge detection signal C becomes a low level in a case where any one of the secondary batteries has a voltage no greater than the overcharge detection voltage. The low level signal output from the inverter circuit M2 and the low level overdischarge detection signal C are input to the NOR circuit M3. In this case, a high level signal is output from the NOR circuit M3.

The overdischarge detection confirmation signal D is configured to become a high level when the counter E becomes active and a delay time elapses after detection of overdischarge. Accordingly, the high level signal output from the NOR circuit M3 and the low level overdischarge detection confirmation signal D are input to the XNOR circuit M4. In this case, a low level signal is output from the XNOR circuit M4. The counter E becomes active by the low level signal output from the XNOR circuit M4. The counter E is configured to measure a predetermined delay time when overdischarge is detected. After the predetermined delay time elapses, the overdischarge detection confirmation signal D becomes a high level.

(C)<Overdischarge of One Battery Cell Detected while Overcharge of Other Battery Cell is Detected in a Case where a Charger is Connected to Charge/Discharge Protection Circuit>

When overdischarge of one battery cell 1 is detected while overcharge of the other battery cell 2 is detected in a case where the charger 3 is connected to the charge/discharge protection circuit 5, the standby signal A becomes a high level owing to the charger 3 being connected to the charge/discharge protection circuit 5.

When the overcharge of the other battery cell 2 is detected, the overcharge detection signal B becomes a high level. Accordingly, the high level standby signal B and the high level overcharge detection signal B are input to the NAND circuit M1. In this case, a low level signal is output from the NAND circuit M1 and input to the inverter circuit M2. Thereby, a high level signal is output from the inverter circuit M2.

When the overdischarge of one of the battery cells 1 is detected, the overdischarge detection signal C becomes a low level. Accordingly, the low level overdischarge detection signal C and the high level signal output from the inverter circuit M2 are input to the NOR circuit M3. In this case, a low level signal is output from the NOR circuit M3.

Since the overdischarge of the battery cell 1 is detected, the overdischarge detection confirmation signal D becomes a high level. Accordingly, the low level signal output from the NOR circuit M3 and the high level overdischarge detection confirmation signal D are input to the XNOR circuit M4. In this case, a low level signal is output from the XNOR circuit M4. The low level signal output from the XNOR circuit M4 activates the counter E, to thereby compulsorily switch on the discharge controlling FET 200 and switch off the charge controlling FET 100 (because overcharge is detected). Accordingly, the charge/discharge protection circuit 5 enters a charge restricted mode.

(D)<Overcharge of One Battery Cell Detected Before Overdischarge of Other Battery Cell is Detected by Disconnecting a Charger from Charge/Discharge Protection Circuit>

When overcharge of one battery cell 1 detected before overdischarge of other battery cell 2 is detected by disconnecting the charger 3 from the charge/discharge protection circuit 5, first, the overcharge detection signal B becomes a high level owing to the detection of the overcharge of the battery cell 1 whereas the standby signal A becomes a high level since overdischarge is not detected at this stage. Accordingly, the NAND circuit M1 outputs a low level signal. Since the low level signal output from the NAND circuit M1 is input to the inverter circuit M2, the inverter circuit M2 outputs a high level signal.

In a case where overdischarge of the other battery cell 2 is detected, the overdischarge detection signal C becomes a low level signal whereas the overdischarge detection signal C becomes a high level signal in a case where no overdischarge of the other battery cell 2 is yet detected. Because the high level signals output from the inverter circuit M2 and the overdischarge detection signal C are input to the NOR circuit M3, the charge controlling FET 100 is switched off when overcharge of one battery cell 1 is detected before detection of overdischarge of the other battery cell 2, so that the overcharge state can be maintained and an excessive flow of current can be prevented.

The above-described configuration of the overcharge protecting circuit 25 can be applied to existing circuits and enable reduction of both circuit size and chip area. It is to be noted that the configuration of the overcharge protecting circuit 25 illustrated in FIG. 2 is merely one embodiment of the present invention. A configuration which is logically equivalent to the overcharge protecting circuit 25 illustrated in FIG. 2 may be used. For example, the NAND circuit M1 and the inverter circuit M2 may be replaced with a single AND circuit.

With one embodiment of the above-described charge/discharge protection circuit, since a charge controlling FET can be switched off in a case where plural serially connected secondary batteries lose balance, charging current can be prevented from excessively flowing in the charge/discharge protection circuit. Thereby, degradation of the FET can be prevented.

With another embodiment of the above-described charge/discharge protection circuit, since a discharge controlling FET can be switched on and a charge controlling FET can be switched off (that is, not switching off both the charge controlling FET and the discharge controlling FET) in a case where plural serially connected secondary batteries lose balance, charging current can be prevented from excessively flowing in the charge/discharge protection circuit. Thereby, degradation of the FET can be prevented.

With another embodiment of the above-described charge/discharge protection circuit, since an overcharge protecting circuit prioritizing detection results corresponding to overcharge of a secondary battery is used with a few logical gates, chip area can be reduced. Thereby, size-reduction of the charge/discharge protection circuit can be achieved.

With another embodiment of the above-described charge/discharge protection circuit, a battery pack or an electronic device (e.g., mobile phone, portable game device, digital camera, portable audio device) including the battery pack can obtain a charge/discharge protection circuit that can prevent excessive flow of charging current and degradation of the FET.

Further, the present invention is not limited to these embodiments, but variations and modifications may be made without departing from the scope of the present invention.

The present application is based on Japanese Priority Application No. 2007-238685 filed on Sep. 14, 2007, with the Japanese Patent Office, the entire contents of which are hereby incorporated by reference.

The invention claimed is:

1. A charge/discharge protection circuit for protecting a plurality of serially connected secondary batteries from overcharge, overdischarge, and current overflow by detecting overcharge, overdischarge, and current overflow and switching on/off a discharge controlling FET or a charge controlling FET according to the detection results, comprising;
an overcharge protecting circuit configured to prioritize the detection results corresponding to overcharge and switch off the charge controlling FET in a case where a charger is connected to the charge/discharge protection circuit.

2. A charge/discharge protection circuit for protecting a plurality of serially connected secondary batteries from overcharge, overdischarge, and current overflow by detecting overcharge, overdischarge, and current overflow and switching on/off a discharge controlling FET or a charge controlling FET according to the detection results, comprising;
an overcharge protecting circuit configured to prioritize the detection results corresponding to overcharge and switch on the discharge controlling FET and switch off the charge controlling FET in a case where overdischarge of one of the secondary batteries is detected while overcharge of another secondary battery is detected even when the one of the secondary batteries has a voltage no greater than an overdischarge detection voltage.

3. A charge/discharge protection circuit for protecting a plurality of serially connected secondary batteries from overcharge, overdischarge, and current overflow by detecting overcharge, overdischarge, and current overflow and switching on/off a discharge controlling FET or a charge controlling FET according to the detection results, comprising;
an overcharge protecting circuit configured to prioritize the detection results corresponding to overcharge and prevent overflow of current in one of the plural secondary batteries by switching off the charge controlling FET in a case where overcharge of the one of the plural secondary batteries is detected.

4. The charge/discharge protection circuit as claimed in 1, wherein the overcharge protecting circuit includes
a NAND circuit for receiving a standby signal and an overcharge detection signal, the standby signal becoming a low level when overdischarge is detected and becoming a high level when the charge/discharge protection circuit is in a regular mode and when the charger is connected to the charge/discharge protection circuit, the overcharge detection signal becoming a low level when overcharge is not detected and becoming a high level when overcharge is detected, an inverter circuit for receiving an output signal from the NAND circuit, a NOR circuit for receiving an output signal from the inverter circuit and an overdischarge detection signal becoming a high level when overdischarge is not detected and becoming a low level when overdischarge is detected, and an XNOR circuit for receiving an output signal from the NOR circuit and an overdischarge detection confirmation signal becoming a high level when a delay time elapses after detection of overdischarge and becoming a low level when overdischarge is not detected.

5. A battery pack comprising:
the charge/discharge protection circuit as claimed in claim 1.

6. An electronic device comprising:
the battery pack claimed in claim 5.

7. A mobile phone comprising:
the battery pack as claimed in claim 5.

8. A portable game device comprising:
the battery pack as claimed in claim 5.

9. A digital camera comprising:
the battery pack claimed in claim 5.

10. A portable audio device comprising:
the battery pack claimed in claim 5.

* * * * *